United States Patent
Booij et al.

(10) Patent No.: US 9,209,909 B2
(45) Date of Patent: Dec. 8, 2015

(54) ACOUSTIC POSITION-DETERMINATION SYSTEM

(75) Inventors: Wilfred Edwin Booij, Nordby (NO); Oystein Haug Olsen, Asker (NO)

(73) Assignee: SONITOR TECHNOLOGIES AS, Oslo (NO)

( * ) Notice: Subject to any disclaimer, the term of this patent is extended or adjusted under 35 U.S.C. 154(b) by 1018 days.

(21) Appl. No.: 13/145,494

(22) PCT Filed: Jan. 20, 2010

(86) PCT No.: PCT/GB2010/000080
§ 371 (c)(1),
(2), (4) Date: Oct. 17, 2011

(87) PCT Pub. No.: WO2010/084308
PCT Pub. Date: Jul. 29, 2010

(65) Prior Publication Data
US 2012/0044786 A1    Feb. 23, 2012

(30) Foreign Application Priority Data

Jan. 20, 2009  (GB) .................................... 0900929

(51) Int. Cl.
| | |
|---|---|
| *G01S 5/00* | (2006.01) |
| *H04B 11/00* | (2006.01) |
| *G01S 3/808* | (2006.01) |
| *G01S 5/02* | (2010.01) |
| *G01S 5/18* | (2006.01) |
| *G01S 5/22* | (2006.01) |

(52) U.S. Cl.
CPC ............. *H04B 11/00* (2013.01); *G01S 3/8083* (2013.01); *G01S 5/0273* (2013.01); *G01S 5/18* (2013.01); *G01S 5/22* (2013.01)

(58) Field of Classification Search
CPC ........... G01S 5/22; G01S 5/18; G01S 5/0273; G01S 3/8083; H04B 11/00
See application file for complete search history.

(56) References Cited

U.S. PATENT DOCUMENTS

| | | | |
|---|---|---|---|
| 4,328,569 A * | 5/1982 | Trott et al. ..................... | 367/103 |
| 6,130,859 A | 10/2000 | Sonnenschein et al. | |
| 6,532,192 B1 | 3/2003 | Reid | |
| 6,778,130 B1 * | 8/2004 | Bevan et al. ................... | 342/174 |
| 7,672,196 B1 * | 3/2010 | Hanyu ........................... | 367/124 |
| 2003/0142587 A1 * | 7/2003 | Zeitzew ......................... | 367/127 |
| 2004/0090865 A1 | 5/2004 | Davies et al. | |

(Continued)

FOREIGN PATENT DOCUMENTS

| | | |
|---|---|---|
| EP | 1271175 | 1/2003 |
| WO | 2008005931 | 1/2008 |

OTHER PUBLICATIONS

Sousa et al. "Joint Positioning and Navigation Aiding System for Underwater Robots", Oceans, 2008, IEEE Sep. 15, 2008, p. 1-8.

(Continued)

*Primary Examiner* — Isam Alsomiri
*Assistant Examiner* — Hovhannes Baghdasaryan
(74) *Attorney, Agent, or Firm* — O'Shea Getz P.C.

(57) ABSTRACT

The position of a mobile unit (12) within a detection zone is determined. An acoustic signal is emitted from the mobile unit and received along a first path (54). An echo of the signal is received after reflection from a surface (46) within said detection zone. The position of the mobile unit (12) within the detection zone is determined from the times of arrival of the signal and echo.

31 Claims, 4 Drawing Sheets

(56) References Cited

U.S. PATENT DOCUMENTS

| | | | |
|---|---|---|---|
| 2004/0105344 A1 | 6/2004 | Davies et al. | |
| 2005/0249036 A1 | 11/2005 | Davies et al. | |
| 2006/0221769 A1* | 10/2006 | Van Loenen et al. | 367/99 |
| 2007/0253574 A1* | 11/2007 | Soulodre | 381/94.2 |
| 2008/0151692 A1 | 6/2008 | Dijk | |
| 2009/0251996 A1 | 10/2009 | Dijk | |
| 2010/0238862 A1* | 9/2010 | Davidson et al. | 370/328 |

OTHER PUBLICATIONS

Chitre et al. "Underwater Acoustic Communications and Networking: Recent Advances and Future Challenges", Marine Technology Society Journal, Spring 2008, vol. 42, No. 1.

* cited by examiner

ACOUSTIC POSITION-DETERMINATION SYSTEM

This application is entitled to the benefit of, and incorporates by reference essential subject matter disclosed in PCT Application No. PCT/GB2010/000080 filed on Jan. 20, 2010, which claims priority to Great Britain Patent Application No. 0900929.1 filed Jan. 20, 2009.

BACKGROUND OF THE INVENTION

1. Technical Field

This invention relates to an indoor position determining system, particularly, although not necessarily exclusively, using ultrasound.

2. Background Information

There are many situations in which it is desirable to be able to determine the location of a moveable object, such as an item of equipment or a person, within a given area. It is known to provide room-level location using ultrasonic transmitters or tags attached to the objects or persons to be located; and a suitable ultrasonic receiver located in each room that can establish the presence or absence of a given tag. This can be useful for stock inventory or locating personnel but it is not accurate enough for some applications.

It has also been proposed to use an array of ultrasonic receivers distributed around a monitoring zone to determine the position of a tag within the zone using trilateration—i.e. using the time taken for the signal from the tag to reach different receivers. However this would not be very practical for a large installation as there would be a high equipment cost associated with a lot of separate receivers. Furthermore, the installation cost would also be high (for example, cabling for power and communication may need to be laid separately to each unit), and the end result can be unsightly if it is retrofitted due to the need to have multiple units within each room.

Another problem with implementing this idea practically is that in real environments there are many surfaces, for example the walls of a room, from which the tag's signals can be reflected before being received. These can have the tendency to obscure the signals of interest and require complex processing to eliminate. For example a geometrical and a statistical approach for identifying and eliminating inaccurate distance measurements due to reflections are described in "A New Location Technique for the Active Office", IEEE Personal Communications, Vol. 4, No. 5, October 1997, pp 42-47. The problems caused by reflections can be mitigated by increasing the number of receivers, but this just further increases the cost.

It has been proposed in WO 2006/013512 to use a single base station to determine the location of a tag using the line of sight signal from the tag as well as reflected signals caused by reflections off the walls, ceiling, floor and possible other surfaces in a room by use of a signature-matching method. A time-series signature of the signal and its reflections received by the base station is matched to stored model signatures or templates. Such an approach has a number of shortcomings: in particular, it provides poor positioning accuracy since signature-matching algorithms cannot perform well in noisy environments (such as when multiple received signals or their echoes overlap in time); furthermore, the accuracy of the method is limited to the number of candidate model signatures or templates, which is typically constrained by available processing power, memory space and time.

SUMMARY OF THE INVENTION

When viewed from one aspect, the present invention provides a method of determining the position of a mobile unit within a detection zone comprising: emitting an acoustic signal from the mobile unit; receiving said acoustic signal along a first path from the mobile unit; receiving an echo of said acoustic signal after reflection from a surface within said detection zone; determining the time of arrival of the acoustic signal along said first path; determining the time of arrival of the echo; and determining the position of the mobile unit within the detection zone from said times of arrival.

The invention also extends to a corresponding position-determining system comprising a mobile unit, receiver and processing means, the mobile unit being located within a detection zone, wherein: the mobile unit is arranged to emit an acoustic signal; the receiver is arranged to receive said acoustic signal along a first path from the mobile unit, and to receive an echo of said acoustic signal after reflection from a surface within said detection zone; and the processing means is arranged to determine the time of arrival of the acoustic signal along said first path, to determine the time of arrival of the echo, and to determine the position of the mobile unit within the detection zone from said times of arrival.

The position-determining system preferably further comprises storage means and/or display means and/or electronic communication means, and is arranged to store and/or display and/or communicate electronically said determined position of the mobile unit.

The invention also extends to processing means adapted to receive data from a receiver which receives: an acoustic signal emitted by a mobile unit that has traveled along a first path to the receiver; and an echo of the acoustic signal after reflection from a surface; wherein the processing means is arranged to: determine the time of arrival of the acoustic signal along said first path; determine the time of arrival of the echo; and determine the position of the mobile unit within a detection zone from said times of arrival.

The processing means is preferably further arranged to store and/or display and/or communicate electronically said determined position of the mobile unit.

The invention also extends to a software product containing instructions which, when executed on processing means adapted to receive data from a receiver which receives: an acoustic signal emitted by a mobile unit that has traveled along a first path to the receiver; and an echo of the acoustic signal after reflection from a surface; causes the processing means to: determine the time of arrival of the acoustic signal along said first path; determine the time of arrival of the echo; and determine the position of the mobile unit within a detection zone from said times of arrival.

Preferably the software product is adapted to cause the processing means to store and/or display and/or communicate electronically said determined position of the mobile unit. The software product may be stored on a carrier or loaded in a memory.

The first path may be an indirect path, i.e. the acoustic signal along the first path is reflected from a surface. In such a case only echoes are used for the calculation. However, in preferred embodiments, the first path is a direct path so the acoustic signal received along the first path is a direct acoustic signal. In some embodiments, the direct acoustic signal is used when such is available (e.g. when there is an unobstructed line of sight between the mobile unit and the receiver), but an indirect path is used when no direct path exists (e.g. because of the presence of an obstruction).

Thus it will be seen by those skilled in the art that, in accordance with the present invention, rather than seeking to cancel out from the received signal all information relating to sound from the mobile unit that has been reflected from nearby surfaces, or trying to perform a pattern matching operation, the time of receipt of one or more reflections is individually calculated and used to determine the position of the mobile unit. The intentional use of additional information relating to the timing of reflections can increase the accuracy of the position determination, or reduce the minimum number of receivers required to determine unambiguously the position of the mobile unit, when compared with an approach that discards echoes. It makes it easier to provide better accuracy than a signature-matching approach. Knowledge of the echo characteristics used in positioning can also be used to increase the rate at which position estimates of the mobile unit data can be updated, and can further be used to increase the rate at which data (e.g. a tag identity code) can be transmitted between the mobile unit and the receiver.

The times of arrival of the first signal (hereafter referred to for convenience as the direct signal, but noting that features described with reference to the direct signal, should, wherever appropriate, be understood as applying equally to an indirect first signal) and/or of the echo or echoes may variously be determined as absolute times (e.g. defined by an internal system clock or a signal from an external clock), for example using a clock built into the receiver. Alternatively relative timings could be used. For example, the times may be relative to the arrival of the direct acoustic signal at the receiver; i.e. this first arrival event defines a 'time zero', against which reference point the time(s) of the later-arriving echo or echoes are determined.

In theory any surface in the monitoring zone could be used for reflecting, but preferably the surface is a static surface and is preferably substantially planar. In such embodiments the reflecting surface effectively acts as a 'sonic mirror'. The Applicant has appreciated that by suitable processing of the received signal it can be treated as though there is a second, virtual receiver the same distance on the other side of the surface. Of course by using multiple reflecting surfaces, multiple such virtual receivers arise. In some embodiments therefore a plurality of echoes is received at the receiver and the times of arrival of each echo are determined and used to determine the position of the mobile unit within the detection zone.

In some embodiments the signal strength of an echo, e.g. compared to the direct path signal or another echo, is used in the position determination, e.g. by giving an estimate of distance traveled. Here advantageously one may use knowledge of the spherical and dissipative attenuation of ultrasound in air and even knowledge of the reflective characteristics of the major surfaces.

The virtual receiver(s) can be used to determine the position of the mobile unit just as if there were multiple real receivers in the corresponding positions and there were no reflecting surfaces. In other words the, or each, virtual receiver may be considered as if it had received the echo as a direct signal from the mobile unit. The position which the virtual receiver is treated as having can be determined from the known positions of the real receiver and the reflecting surface. Once the surface corresponding to each echo has been determined, a conventional trilateration or multilateration calculation, using spherical (time-of-arrival) or hyperbolic (time-difference-of-arrival) methods, can be performed to determine the position of the mobile unit. Using this modified trilateration or multilateration approach is advantageous as it is computationally efficient when compared with, for example, ray tracing.

In embodiments having more than one reflecting surface, it may be necessary to determine which echo has been reflected from which surface (and thus which virtual receiver position it corresponds to). This may be done by an exhaustive trial-and-error approach—i.e. trying every possible pairing of echoes and surfaces and determining which gives the most consistent or plausible estimate for the position of the mobile unit. In preferred embodiments, however, the receiver has sufficient information from the received signals to determine which surface a particular echo arises, e.g. by considering the signal strength of the echo as well as its arrival time.

In preferred embodiments the receiver is located near a boundary surface (wall, floor or ceiling) of a room. In some embodiments the nearest boundary surface is used as the reflecting surface. This can allow echoes to be identified relatively easily as they will follow closely after the direct signal.

In some embodiments the receiver is located near a corner to give one or two nearby additional reflecting surfaces which can be used as virtual receivers. The receiver could be mounted to one of the boundary surfaces and use only the other boundary surface(s) in the corner as reflecting surfaces, or it could be extended from and be supported by one of the surfaces.

In other embodiments the opposite boundary surface is used as the reflecting surface. In some embodiments, the receiver is mounted on a wall of a room in parallel opposition to the wall acting as the reflecting surface. This allows a very wide degree of coverage. In an exemplary set of embodiments, the receiver is mounted to the ceiling of the room—e.g. at the center of the room—and uses the floor as the reflecting surface. This gives almost 360 degrees of coverage.

The receiver could comprise a single transducer that receives both the direct and reflected signals, with analysis of the output of the transducer being used to distinguish between the direct signal and the reflected one (e.g. through their relative signal strengths and/or times of arrival). In a set of preferred embodiments however, a plurality of independent transducers are provided. These can then be configured, e.g. in respect of their positioning, response characteristics or data analysis applied, to be optimized for the reception of the direct and reflected signals respectively.

As will be appreciated, the use of virtual receivers in accordance with the invention means that fewer real receivers are required to give the same level of positional accuracy. In particular there is thus no requirement to provide receivers spaced apart from one another to cover a monitoring zone. This clearly has advantages in terms of equipment and installation costs as explained earlier. Indeed, in preferred embodiments of the invention, mobile unit position determination can be carried out by a single receiving unit, which may comprise one or more transducers incorporated into it. The benefit in providing a single unit, installed at a single location, is that it dramatically reduces the installation cost and inconvenience as compared to installing units at multiple locations.

In order to determine the position of the mobile unit accurately, use can be made of information relating to the relative or absolute positions and/or orientations of the receiver and the reflective surface(s). This information is therefore preferably used to determine the position of the mobile unit within the detection zone. Such information might relate to the geometry of the detection zone; e.g. the locations of all its boundary surfaces. Such information may be determined before or during installation by, for example, a human installer measuring distances within the detection zone. Preferably, however, an automatic calibration step is conducted in which the processing means acquires information relating to the location of the reflecting surface(s) and/or the receiver by receiving an acoustic signal. This signal may be emitted by the mobile unit (e.g. when at a known location) or some other source but preferably the receiver, or a transmitter housed in the same unit, itself emits the signal.

In one set of embodiments the receiver comprises two independent transducers, the second having greater directional sensitivity than the first. This advantageously allows the first transducer to receive the direct signal from the mobile unit and the second transducer to receive the echo reflected from the reflecting surface, since the directional sensitivity can be exploited to mean that the second transducer will pick up the echo in preference to the direct signal. For example in some preferred embodiments there is at least one imaginary line included in the response half angle which strikes the reflecting surface within the detection zone. The response half angle is defined as the angle over which the sensitivity is greater than half the maximum—i.e. the angle at which the response falls off by 6 dB. Such arrangements make distinguishing the echo from the direct-path signal and from other noise (e.g. further echoes off other objects) easier.

In an exemplary set of embodiments the first transducer comprises an omni-directional microphone. The second transducer could comprise a directional microphone or an omni-directional one with a waveguide or shielding to add directionality. Indeed a waveguide or shielding could be used even with an inherently directional microphone to further enhance its directionality. In some embodiments, the second transducer has a half-angle of between 10 and 60 degrees; preferably between 10 and 40 degrees; for example 30 degrees. Preferably the first transducer either does not have a half-angle (i.e. its angular variation is less than 6 dB) or the half-angle is greater than that of the second transducer; preferably greater than 60 degrees.

In another set of embodiments, an array of transducers is employed. The relative phase and/or arrival times of the signal at the respective transducers in the array (known as a phased array or beam-forming array), allows the direction of a given signal to be determined. References herein to a directional microphone or transducer can equally be understood to refer to a beam-forming or phased array of transducers with associated processing means.

In some of the embodiments the second transducer, or a part thereof, is moveable in order to allow its directional axis to be adjusted. This allows the set-up to be optimized for a particular installation. In one set of embodiments the second transducer is mounted on a moveable support, such as a rotatable gimbal. In other embodiments, such as those employing a phased array of transducers, no physical adjustment is provided. Rather directional specificity can be achieved in at signal processing stage.

The receiver may comprise a plurality of microphones having relatively greater directionality than said first microphone; e.g. three microphones in total. Preferably the directional axes of the relatively-directional microphones are mutually nonparallel.

The receiver could be provided in a unit containing its own power supply, such as a battery, capacitor, fuel cell or solar panel but preferably has a wired electrical connection. In some particularly preferred embodiments, the receiver receives power over Ethernet (as defined in IEEE 802.3). The receiver may support external communication (e.g. to a further receiver unit, to a satellite microphone unit, or to a server) over wired connections, such as Ethernet, FireWire or USB, or over a wireless link, such as infrared or radio-frequency (e.g. IEEE 802.11).

The receiver unit may comprise the aforesaid processing means, or the processing means may be separate from the receiver unit, being, for example, a server located outside the detection zone. In some embodiments, more than one receiver is employed at respective locations. The additional receivers may variously be arranged to receive respective direct sound signals from the mobile unit and/or reflected signals. They may contain some or all of the features of the first receiver. In such embodiments, processing means are preferably arranged to use arrival times of signals at a plurality of receivers to determine the position of the mobile unit within the detection zone.

In embodiments having a plurality of receivers for a detection zone, where each receiver comprises a clock, there is preferably provided means for synchronizing the clocks. This may be performed using a protocol over a network connecting the receivers. In an installation comprising multiple distinct detection zones, each with its own receiver(s), clocks may be synchronized across the detection zones; although this may not be necessary (i.e. purely local synchronization within each detection zone may suffice). In some embodiments, the mobile unit comprises a clock; in such cases, a means is preferably provided for synchronizing the mobile unit's clock with those of one or more receivers.

Preferably the mobile unit comprises attachment means for attaching it to an object or person. Advantageously it comprises its own power supply; e.g. a battery, a capacitor, a fuel cell or a solar panel. The acoustic signal may be of any appropriate frequency; it may be audible, i.e. in the range 20 Hz-20 kHz, but it is preferably ultrasonic; i.e. greater than 20 kHz. The acoustic signal may be a constant frequency (i.e. a tone) but it is preferably of varying frequency such as being chirped—e.g. a linear chirp—as this can provide better noise resistance. In particularly preferred embodiments, the acoustic signal consists of a rising chirp followed by a falling chirp (or vice versa), optionally with a gap therebetween. Advantageously these are linear chirps, which can provide good resistance to Doppler shifting (e.g. if the mobile unit is moving relative to the receiver(s)). Typically the chirp frequency range is such that the Doppler frequency shift resulting from relative motion constitutes only a small fraction of the frequency range of the chirp. Geometric chirps can equivalently be used, but are more complex to generate.

Echoes of interest may then be separated from other peaks by performing separate cross-correlations for the up and down chirp signals and identifying peaks having similar amplitude and sharpness to each other that are shifted by the same time separation as the two chirps. One possible criterion that may be applied in this context is $$a\left|\frac{A_\uparrow - A_\downarrow}{A_\uparrow + A_\downarrow}\right| + (1-a)\left|\frac{S_\uparrow - S_\downarrow}{S_\uparrow + S_\downarrow}\right| < \text{threshold}$$

where A is the peak amplitude and S is the sharpness of the associated peaks of the up and down chirp, while a is a weighing factor between 0 and 1.

The acoustic signal may encode information such as an identification (ID) code for the mobile unit or status information (e.g. the battery level of the mobile unit). Alternatively, such information may be sent separately. This could be over an independent electronic or electromagnetic channel such as a radio channel. Preferably, however, such information is sent acoustically, but separated in time and/or frequency from the acoustic signal used for location. Advantageously, information is sent after the acoustic signal. In this way, the acoustic signal can allow the receiver to determine information relating to characteristics of the acoustic environment occupied by the mobile unit and the receiver; e.g. the amount of Doppler shift, if any, in the signal, the amount and nature of any background noise, and the attenuation and echo characteristic of the detection zone. Such information can be used to increase accuracy when decoding other communications from the mobile unit, enabling higher data transmission rates for example.

Using a predetermined transmission to facilitate the interpretation of a data transmission in an acoustic environment is novel and inventive in its own right and thus when viewed from another aspect, the invention provides a method of transmitting information from a mobile unit within a detection zone to a receiver, comprising: emitting a predetermined acoustic signal from a mobile unit; receiving the predetermined signal; calculating an estimate of the transformation undergone by said predetermined signal in transmission; emitting an acoustic signal encoding said information; receiving the encoded signal; and decoding said encoded signal using said estimate of the transformation.

This aspect of the invention extends to the receiver and/or processing means associated therewith adapted to carry out said receiving, calculating and decoding steps; and to a computer software product adapted to carry out said steps when executed.

The predetermined signal could be used just for calculating the estimate of the transformation. Preferably however it is used for determining the position of the mobile unit—e.g. as described in accordance with the foregoing aspects of the invention.

In accordance with any aspect of the invention in which information is encoded on an acoustic signal, such encoding could be by single frequency shift keying (FSK), multiple frequency shift keying (MFSK), amplitude shift keying (ASK), phase shift keying (PSK) or any other suitable mechanism. In one set of preferred embodiments information is encoded in the sequence of a set of signals, e.g. linear chirps, which are selected from a finite set. The set of signals is thus effectively an 'alphabet'. The signals preferably have low cross-correlation and preferably a highly-peaked auto-correlation. Such an encoding scheme can provide greater robustness to multi-path and other interference than, say, FSK.

The predetermined signal could be transmitted before or after the encoded signal or could be a part of it. For example where the encoded signal comprises a sequence of signals from a finite set of signals, one or more of these signals can act as the predetermined signal.

Being able to use knowledge of the transformation of the transmitted signal accurately to identify a transmission and its echoes means that quite apart from trying to filter out echoes as unwanted noise, the information contained in them can be extracted to give a more reliable data signal which therefore facilitates decoding. This in turn means that a higher data transmission rate can be used.

In preferred embodiments the position of the mobile unit is calculated using the time of flight of the sound from the mobile unit to the receiver. For such timing purposes receipt of the acoustic signal may be defined as being when the absolute signal strength output of a transducer forming part of the receiver exceeds a predetermined threshold, either instantaneously or over a sample period.

The time of flight can be measured in a number of ways. One way is to use a separate electromagnetic signal as the basis for timing the acoustic signal. Conveniently, for example, the mobile unit could transmit an electromagnetic signal simultaneously with, or at least having a predefined timing relationship to, the acoustic signal. By determining the delay between receipt of the electromagnetic signal (either at the receiver or at another receiver) and receipt of the acoustic signal at the receiver, the time of flight of the acoustic signal can be calculated (since the electromagnetic signal can typically be considered to arrive instantaneously). This assumes that the receiver is listening for the electromagnetic signal, or at least that it is informed of its transmission, or receipt at another receiver.

Alternatively, the time of flight of the acoustic signal could be determined by transmitting an electromagnetic signal to the mobile unit, the mobile unit being arranged to emit the acoustic signal on receipt of the electromagnetic signal, and determining the delay between transmission of the electromagnetic signal and receipt of the acoustic signal at the receiver. Again, the time of flight of the electromagnetic signal can be assumed to be zero, and the delay gives the time of flight of the acoustic signal plus a known 'turnaround time' at the mobile unit—i.e. the time taken between the mobile unit receiving the electromagnetic signal and transmitting the acoustic signal.

In another set of embodiments the time of flight is measured using synchronized clocks in the mobile unit and receiver. Thus in such embodiments the mobile unit comprises a clock and transmits information relating to the time of the acoustic signal transmission. This timing information may be encoded in the sound itself, or sent acoustically but separately from the aforesaid signal (e.g. at a later time or on a different frequency), or it may be sent over a separate channel to the acoustic channel such as a WLAN or other radio-frequency channel.

The receiver, or a server in communication with the receiver, preferably comprises a clock and is arranged to determine information relating to the time at which the sound is received by the receiver. The time of flight of the sound can then be determined from the information relating to the time of the acoustic transmission and from the information relating to the time of the receipt of the acoustic signal.

The accuracy of the aforementioned procedure is dependent on the degree of synchrony between the mobile unit and the receiver. Preferred methods in accordance with the invention comprise the step of synchronizing a clock on the mobile unit with a remote clock. The remote clock could be one associated with the receiver or could be separate from it (albeit that the receiver might then too be synchronised from it). In some preferred embodiments said mobile unit synchronization is performed using an electromagnetic—e.g. an RF link. In one set of embodiments, a clock synchronization signal is sent from the receiver to the mobile unit by radio before an acoustic locating signal is transmitted from the mobile unit. This synchronization signal could comprise the current time or a correction factor.

In an alternative set of embodiments, the mobile unit emits a signal on a predetermined schedule (e.g. at uniform intervals) and thus the time of transmission by the mobile unit may be known by the receiver or processing means.

Alternatively synchronization of the mobile unit could be carried out with the mobile unit in a known position relative to the receiver. The difference between the true position of the mobile unit and the position estimated from the acoustic signal received by the receiver could be used to calibrate or synchronize the mobile unit. A similar method could be used to set-up or calibrate the receiver. In one convenient example a mobile unit could be placed in a docking unit connected to the receiver. This could be fixed and of known position, or itself transmit a signal for determining its position (which does not need to be acoustic). The docking station could be connected via wired connection to maintain synchronization, and could then connect directly to the mobile unit to synchronize it—i.e. without requiring a separate RF transmitter/receiver on the mobile unit.

Another approach devised by the Applicant to synchronizing a clock on the mobile unit with a remote clock is first to determine the position of the mobile unit using only information relating to the time differences of arrival (TDOAs) of the sound along a plurality of paths at one or more receivers, which does not require use of the mobile unit's clock; and then, if appropriate, to adjust or compensate for the mobile unit's clock based on the determined position of the mobile unit and the absolute time of arrival of the sound along one of the plurality of paths at a receiver, measured against the remote clock. If the clock is to be compensated for, such compensation may be applied by the processing means.

Determining the position of the mobile unit is to be understood to mean determining an estimate of the position to within a degree of confidence or spatial accuracy appropriate to the context to which the invention is applied. No particular level of precision is intended or should be inferred. In some embodiments, the position of the mobile unit may be determined to within the nearest meter; in more preferred embodiments, to within the nearest one or two centimeters; or even to the nearest one millimeter or less.

In some embodiments, an estimate of the accuracy of the position determination can be made. This might be achieved for example using extra information above the minimum requirement for making a position determination. For example it may depend on the extent of agreement between independent estimates of position. The accuracy may be stored and/or displayed and/or communicated electronically. In embodiments in which a clock on the mobile unit is adjusted or compensated for, such adjustment or compensation is preferably only applied when a particular position estimate on which the adjustment or compensation is based is determined to be accurate to within a predetermined margin.

The applicant has realized that this method of clock synchronization is new and inventive in its own right, and thus, from a further aspect, the invention provides a clock-synchronization method comprising: transmitting an acoustic signal from a mobile unit, the mobile unit comprising a clock; receiving the acoustic signal at a plurality of receivers; determining an estimate of the position of the mobile unit from the difference(s) in arrival time and/or phase of the signal at said receivers; calculating a clock correction factor using: the estimated position of the mobile unit, the time of transmission of the signal measured against said mobile unit clock, and the time of arrival of the signal at one of said transducers measured against a reference clock; and applying said correction factor to the mobile unit clock to bring it into synchronization with said reference clock.

Preferably this aspect further comprises the steps of the method of the first aspect of the invention. Preferred features of the first aspect are also preferred features of the present aspect.

The step of applying the correction factor to the mobile unit clock may comprise adjusting the mobile unit clock directly (e.g. so that it outputs time data synchronized with the reference clock), or may comprise applying a correction factor at the receiver or a server to (incorrect) time data output by the mobile unit clock so that the corrected data is synchronized with the reference clock.

The mobile unit may transmit the acoustic signal according to a predetermined schedule, or the acoustic signal may comprise data relating to its time of transmission measured against the mobile unit clock, or such data may be transmitted separately from the acoustic signal—e.g. over an RF link. In particular, if the acoustic channel is busy, the mobile unit may need to back off—it is preferably arranged in such instances to send data relating to the time of transmission over a separate channel, or at least to send back-off information (e.g. attempt number in a predetermined back-off scheme) from which the receiver or system can reconstruct the time of the clock in the mobile unit.

It is preferred in accordance with all the foregoing aspects of the invention, that the time of flight of the reflection or echo of the acoustic signal from the reflecting surface is used to calculate the position of the mobile unit. However this is not essential. For example the time difference of arrival (TDOA) of the echo compared with the direct-path signal (or a signal having followed another path could be used).

The position of the mobile unit may be determined by any appropriate method such as trilateration or multilateration (using time-of-arrival (TOA) information to determine location by spherical intersection or using time-difference-of arrival (TDOA) information to determined location by ellipsoid intersection); or acoustic modeling of the enclosed space, mobile unit, reflecting surface and receiver, e.g. using ray tracing.

In some preferred embodiments the receiver is arranged to estimate the angle of arrival (AOA) of the signal from the mobile unit. This can be achieved for example through exploiting knowledge of the angular response of the transducer, especially where a directional transducer is used. Where there are multiple transducers the difference in phase or timing between the signals received at each can be used. Where there are a small number of discrete transducers this might be accurate enough to give an angular range for the location. Where an array of transducers is provided then beam-forming principles can be used to give a more accurate estimate.

Thus, where the receiver comprises first and second transducers, the invention preferably further comprises determining the time of arrival of the direct acoustic signal at a first transducer and determining the time of arrival of the direct acoustic signal at a second transducer. From these times of arrival, information relating to the direction from which the sound was received at the receiver may be determined. For example, an angle of arrival relative to a reference plane may be estimated. As before, the times of arrival may be absolute or relative to each other. A similar step may be undertaken in respect of the echo or echoes. In addition, or alternatively, to the time arrival, information relating to the phase and/or amplitude of the signal may be determined and used similarly to estimate, or contribute to an estimate of, the direction of arrival. Of course, this approach is not limited only to the first and second transducers, but may be applied across any number of transducers.

Thus, even before a first echo is received at the receiver, some information about the position of the mobile unit within the detection zone can be established. This may not of itself be sufficient to determine an estimate of the mobile unit's location with the required accuracy, but it can be combined with other information such as that relating to the path lengths of the direct path and the echo or echoes determined from time-of-arrival or time-difference-of-arrival information. It may also be used, in a detection zone having multiple reflective surfaces, to determine the identity of a reflective surface by which a particular echo has been reflected.

In some circumstances, it may not be possible to determine the position of the mobile unit by any of the above approaches—for example, if there is no direct path between the mobile unit and the receiver, or if the mobile unit is very close to the corner of a room and thus produces echoes off each of the walls in such close succession that they cannot be separately identified. In such instances, it may nonetheless be desirable to know simply whether the mobile unit is or is not in a given detection zone (such as a room). Thus, preferably, the system is further arranged to determine whether the mobile unit is in the detection zone. Preferably, it is arranged to store and/or display and/or communicate electronically said determination.

In one particular set of embodiments, the mobile unit attempts to initiate a transmission sequence at predetermined time intervals (e.g. every 5 minutes). In one example the mobile unit initially makes an RF transmission to the receiver. The receiver preferably conveys a timeslot to the mobile unit, preferably by radio. The mobile unit preferably conveys a short (and possibly not unique) ID to the receiver. Desirably the combination of the timeslot and the ID is unique for the locality. If connection between the mobile unit and the receiver is not established, the mobile unit could default to using a longer, unique mobile unit ID.

Thus methods of the invention may further comprise receiving timeslot information at the mobile unit and transmitting an acoustic signal from the mobile unit in said timeslot. An ID code is preferably transmitted from the mobile unit. The acoustic locating signal may itself comprise the ID code, or the ID code may be transmitted separately. If transmitted separately but acoustically, it preferably has a low cross-correlation section with said acoustic locating signal, so as to avoid interference if one mobile unit transmits its ID code at the same time as another mobile unit is emitting a locating signal.

In some embodiments the mobile unit is configured to delay transmitting an acoustic signal on a channel until the channel has been silent for at least a predetermined time. The predetermined time is preferably the time taken for sound to travel twice the maximum dimension of the enclosed space (i.e. longer than the longest anticipated reflected signal path). However, if the sounds emitted have a low cross-correlation section with each other, simultaneous transmission may be permitted, thus increasing the maximum possible update rate in an environment containing multiple mobile units.

Any feature described herein with reference to one or more aspects or embodiments of the invention should, where appropriate, be understood as being equally applicable to any other aspect or embodiment of the invention described herein.

BRIEF DESCRIPTION OF THE DRAWINGS

A certain embodiment of the invention will now be described, by way of example only, with reference to the accompanying drawings, in which.

DETAILED DESCRIPTION OF THE INVENTION

Figure 1:
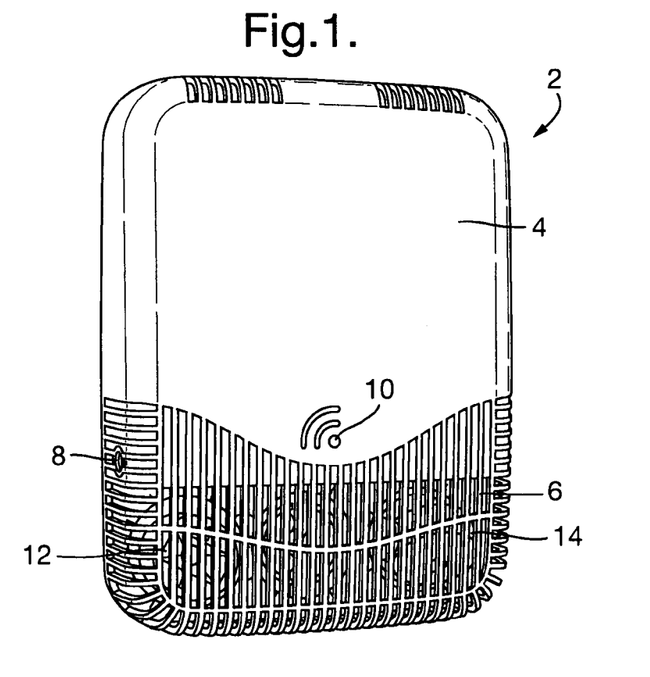
FIG. 1 is a perspective drawing of the exterior of a receiver embodying the invention.

In detail, FIG. 1 shows, in perspective view, the outside of a receiver 2 according to the invention. A molded cover 4 protects the sensitive internal components of the receiver 2 from damaging environmental exposure. However the cover 4 comprises a grilled opening 6 and a circular opening 10 that both allow ultrasound to pass through the cover 4 to the interior of the unit. A connection port 8 is able to receive an Ethernet cable supporting Power over Ethernet. Just visible through the grilled opening 6 are a left directional microphone 12 and a right directional microphone 14. The receiver 2 is preferably arranged to be mounted on a wall or ceiling, but may be freestanding.

Figure 2:
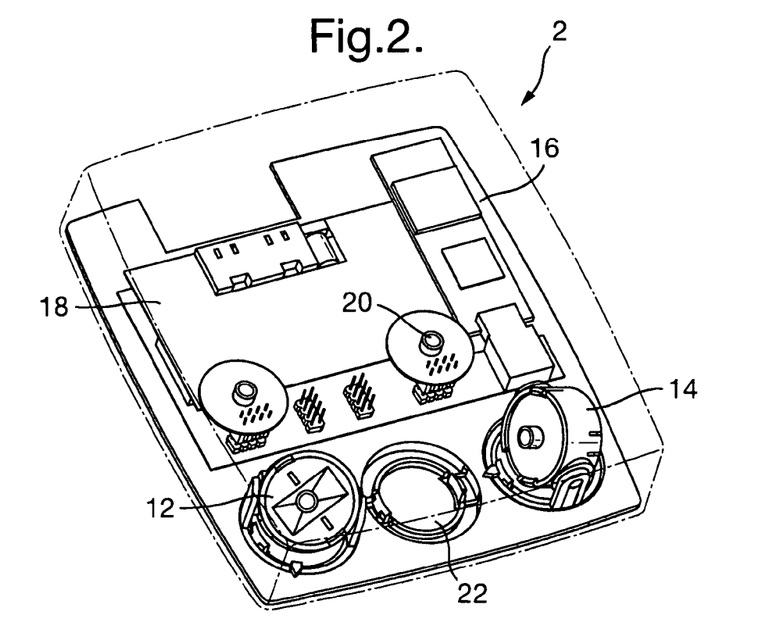
FIG. 2 is a perspective drawing of the interior of the receiver.

FIG. 2 shows the inside of the receiver 2, comprising a flat back member 16 onto which the molded cover 4 (not shown) can be clipped. Also attached to the back member 16 is a circuit board 18 to which discrete electronic components, processors, memory, a back-up battery and communication modules are attached. In electrical communication with the circuit board 18 are the left and right directional microphones 12, 14 and an omni-directional microphone 20. When the molded cover 4 is in place, the circular opening 10 in the cover 4 lines up with the omni-directional microphone 20 to allow sound to reach the microphone freely from all directions forwards of the unit. A circular depression 22 located centrally between the left and right microphones 12, 14 may optionally receive a third directional microphone (not shown).

Figure 3:
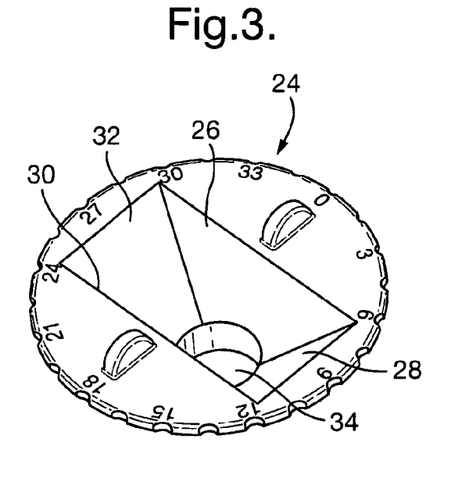
FIG. 3 is a perspective drawing of a waveguide forming part of the receiver.

FIG. 3 shows a close-up view of a waveguide 24, which is a component of each directional microphone 12, 14. The waveguide 24 comprises four planar surfaces 26, 28, 30, 32 arranged around, and tapering in towards, a central hole 34. In use, the planar surfaces cooperate to direct sound from within a relatively narrow cone forwards of the waveguide (having its apex at the centre of the hole 34) towards the hole 34. The planar surfaces also act to block or attenuate the passage through the hole 34 of sound coming from forwards of the waveguide but outside the cone. The half-angle (the sector bounded by the angles at which the sensitivity drops to half the maximum) of each microphone 12, 14 varies inversely with the radius of the hole 34.

Figure 4:
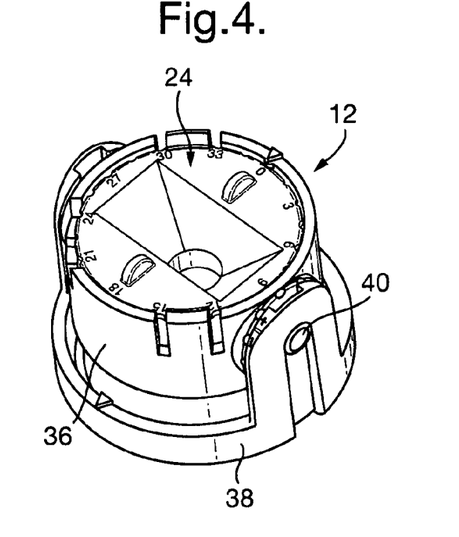
FIG. 4 is a perspective drawing of a directional microphone forming part of the receiver.

FIG. 4 is a detailed view of the left directional microphone 12 (the right directional microphone 14 is identical). The transducer element (not visible) converts sound energy into electrical energy and is located inside the cylindrical body 36 of the microphone. The front of the cylindrical body 36 comprises a waveguide 24 as depicted in more detail in FIG. 3. The transducer element is located near the central hole 34 in the waveguide 24, such that substantially only sound within the directivity pattern of the above-mentioned cone reaches the transducer element.

The directional microphone 12 also comprises a gimbal 38, which is attached to the cylindrical body 36 by a pair of pivots 40 on either side of the body 36. These allow the angle of the body 36 of the microphone 12 to be adjusted relative to the gimbal 38 through 180 degrees about an axis passing through the pivots 40. Furthermore, the gimbal 38 has a circular base which rotatably engages in a circular depression (e.g. 22) in the receiver so as to allow the whole microphone 12 to be rotated to any angle about an axis orthogonal to the aforesaid pivot axis. Thus, when mounted in the receiver 2, the axes of the directional microphones 12, 14 (i.e. the axis of the previously-mentioned cone) can be adjusted to any desired angle in three dimensions relative to the base 16 of the receiver. The grilled opening 6 is preferably arranged so as to allow the free passage of sound from substantially any direction in which the directional microphones 12, 14 may physically be oriented.

Figure 5:
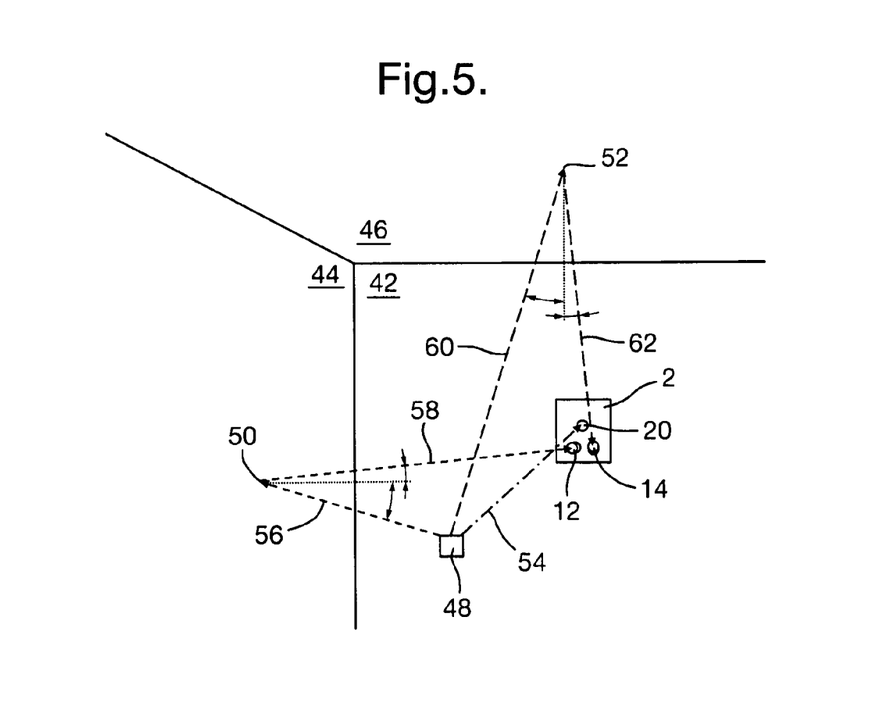
FIG. 5 is a schematic diagram showing how the receiver determines the position of a mobile unit according to the invention.

FIG. 5 shows installation and operation of the receiver 2 to determine the position of a mobile unit 48. The receiver 2 is installed near a corner of a room where a back wall 42, side wall 44 and ceiling 46 meet. The receiver 2 is mounted on the back wall 42 spaced a little away from the corner itself. For example it might be vertically down from the ceiling 42 and horizontally removed from the side wall 44 by approximately 20-150 cm; e.g. 80 cm.

The left microphone 12 is oriented so as to have its directional axis broadly in a horizontal plane and directed towards the side wall 44 at an angle of approximately 45 degrees. The right microphone 14 is oriented so as to have its directional axis broadly in a vertical plane and directed towards the ceiling 46 at an angle of approximately 45 degrees.

A mobile unit 48 is situated within the room, not immediately adjacent either of the walls 42, 44 of the ceiling 46. It may be attached to a person or item of equipment (not shown). It may be arranged to transmit an ultrasound signal substantially evenly throughout the whole room. Alternatively, it may emit sound with a directional pattern into part of the room (for example hemispherically—e.g. from the part of the room higher than the mobile unit). For example, it may emit sound in a pattern having a sound-pressure half-angle of approximately 50 degrees. The mobile unit 48 may comprise an ultrasound transducer such as an MA40S4S from Murata Manufacturing Co., Ltd.

Some of the signal will travel directly to the side wall 44; some directly to the back wall 42; and some directly to the ceiling 46. In particular, of the sound traveling directly to the back wall 42, some will travel along a direct path 54 between the mobile unit and the omni-directional microphone 20 of the receiver 2. Of the sound traveling directly to the side wall 44, some will travel along a direct path 56 to a point 50 on the side wall from which it will be reflected along a direct path 58 to the left unidirectional microphone 12. This direct path 58 is within the reception cone of the microphone 12 and will thus be channeled through the waveguide 24 and into the microphone's transducer element.

Similarly, of the sound traveling directly to the ceiling 46, some will travel along a direct path 60 to a point 52 on the ceiling from which it will be reflected along a direct path 62 to the right unidirectional microphone 14, which has its directional axis angled towards the ceiling 46. As is well known, the angles of incidence and reflection at the point 50 on the side wall 44 (defined relative to the normal to the side wall 44 at that point 50) will be equal to one another; similarly the angles of incidence and reflection at the point 52 on the ceiling 46 will be equal. It can be seen therefore that the side wall 44 and ceiling 46 act as reflecting surfaces for the ultrasonic signal.

Since the length of the direct path 54 is shorter than any reflected path, the sound from the mobile unit 48 traveling along the direct path 54 reaches the receiver 2 first. Although the left and right directional microphones 12, 14 are in the path of the direct path sound, the waveguides 24 of these microphones are arranged to physically attenuate or block such direct-path signals for the majority of possible positions for the mobile unit 48 within the room. The orientations of the directional axes of the left and right directional microphones 12, 14 are such that, for most of the realistic positions of the mobile unit in the room in any given application, their respective transducers register a stronger signal for the reflected sound they receive along the paths 58, 62 from the side wall 44 and ceiling 46 respectively than they register for sound they receive along a direct path 54 from the mobile unit 48 to the receiver 2. If, for example, the mobile unit 48 is to be carried by a person, it may reasonably be assumed that the mobile unit will never be more than 2 m above the floor of the room, and the position of the receiver 2 on the back wall 42 and the angles of the directional microphones 12, 14 may be set accordingly to maximize the signal-strength discriminating abilities of the directional microphones 12, 14 in favor of echoes of the side wall 44 and ceiling 46 respectively over direct-path signals.

If it can be safely assumed, in use, that an echo of interest will always create a stronger signal from a directional microphone 12, 14 than will a direct-path sound or an echo off a different surface from the one of interest, or two or more surfaces, then the time of receipt of the strongest signal within a time window can be taken to be the time of receipt of the echo of interest.

However, even when a signal transmitted by the mobile unit 48 received by the left or right directional microphone 12, 14 along a direct path from the mobile unit 48 is stronger than the corresponding echo of interest received off the side wall 44 or ceiling 46 respectively, the echo will be received at the receiver later than the direct-path sound, and may therefore still be identified as the echo signal.

Moreover, the relative timings and/or phases of each burst of sound (a direct-path sound or any one echo) between the different microphones 12, 14, 20 may be used to gain additional information about the direction from which the sound is received at the receiver. The usefulness of such information may be further enhanced if information related to the pattern of directional sensitivity of each of the microphones 12, 14, 20 is known. Then the relative strengths (amplitudes) of each burst of sound across the different microphones can be used to infer additional information about the direction from which the sound is received. This is explained in greater detail hereinbelow.

The receiver 2, or a processing means in communication with the receiver, comprises a clock and is therefore able to determine the arrival times of the signal traveling along the direct path 54 from the mobile unit 48 to the omni-directional microphone 20.

The signal from the mobile unit 48 comprises at least one, or preferably more, signals having a highly peaked auto-correlation (for example, such that the resulting auto-correlation peak after processing has a time extent of 2 ms or less).

For each of the microphone channels, the receiver 2, or associated processing means, performs a matched filter process to find the positioning and/or data signals. The matched filter process consists of a cross-correlation of the received microphone signal with quadrature versions of all the positioning signals. To add robustness to any Doppler shift in the frequencies of the received signals due to motion of the mobile unit 48, these cross-correlations may be performed for each of various differently Doppler-shifted variants of the known positioning signals. To aid the process of identifying echoes, the received signals may also be cross-correlated amongst themselves using a quadrature approach.

For each of the cross-correlated signals processed, the peaks are identified and the locations, amplitudes and second-order derivatives thereof are found using a second-order polynomial peak finder with a suitable window size. The time instance and attenuation of echo events can then be found by searching for peaks having an amplitude and sharpness (absolute value of the second derivative) above predetermined thresholds.

If multiple positioning signals are emitted by the mobile unit 48, the peaks from each positioning signal can be compared for similarity and combined in order to improve the identification of echoes. If cross-correlation is performed for several Doppler variants, the matched filter which is closest to the true Doppler shift will show the highest and sharpest correlation peak.

Phase information for the received signals can be determined from the ratio of the quadrature components of quadrature cross-correlation. This can be used to determine the time-of-flight to phase-level accuracy (e.g. resolving below 17 mm for 20 kHz ultrasound). However, this does not work if there are large Doppler shifts (e.g. v/c>4*10$^{-3}$) due, for example, to rapid movement of the mobile unit 48. So in the present embodiment peak fitting of two anti-symmetric chirps is used. The mobile unit 48 emits a positioning signal consisting of two chirps with opposite sign of the chirp rate. From this, both Doppler shift and time delay can be determined accurately as follows.

A rising chirp signal $S_{c\uparrow}$ having increasing linear frequency chirp is emitted first, followed by a chirp signal $S_{c\downarrow}$ having decreasing linear frequency chirp (of course, the order of the chirps could be reversed). The two chirps have opposite chirp rate polarity ($C_{r\uparrow}=-C_{r\downarrow}=df/dt=f_{end}-f_{start}/T_c$) but are otherwise identical ($T_c$ being the chirp time duration, $f_{start}$ being the chirp start frequency, and $f_{end}$ being the chirp end frequency). The chirps are transmitted with a time separation $\Delta t_c$ which is greater or equal to the chirp duration.

Using a quadrature cross-correlation method to find the Rxy (cross-correlation signal) of the known chirps with the received microphone signals, the peaks corresponding to the chirp signals can be identified through selection by peak amplitude, sharpness and, knowing the chirp time separation, their spacing in time $\Delta t_c$. Using only linear chirps prevents dramatic loss of correlation when the received signals are Doppler shifted. The use of quadrature cross-correlation furthermore gives much more reliable measures of amplitude.

Having identified the peak pairs for the up and down chirp signals for all the relevant reflections echoes, the time location, amplitude and peak sharpness of the signals can be extracted. Since the received signals may have different Doppler velocities from each other (due to different observation angles between the direct and various possible reflected paths), the timing information from the cross-correlation of the chirps may be skewed. This can be corrected for using the following manipulations.

The difference in time of arrival between the up and down chirp signals corrected for their known separation in time is:

$$\frac{t_\uparrow - (t_\downarrow - \Delta t_c)}{2} = \left(\frac{f_c}{C_r} - \frac{\Delta t_c}{2}\right)(1-\eta)$$

where $f_c$ is the centre frequency of the chirp signals, $C_r$ the chirp rate, and $$\eta = 1 - \frac{v_s}{c_{sound}}$$

the Doppler factor ($v_s$ being the effective velocity of the source with respect to receiver, and $c_{sound}$ being the speed of sound in the room—the speed of sound may be approximated by a constant value, or may be estimated based on measurements of relevant factors such as temperature and humidity, or determined experimentally by, say, timing a sound over a known distance).

Since $f_c$, $C_r$ and $\Delta t_c$ are known, the times of arrival of the two chirp signals can be used to calculate the Doppler factor. Note that this measurement is independent of any frequency deviations suffered by the source (a known problem with many alternative schemes to derive Doppler-shift information).

The sum of the time of arrival between the two chirps, corrected for their known separation in time, is:

$$\frac{t_\uparrow + (t_\downarrow - \Delta t_c)}{2} = \frac{t_d}{\eta} + \Delta t_c\left(\frac{1}{\eta} - 1\right)$$

The true time delay of the signal, $t_d$, can therefore be found by using the measured Doppler factor estimated above. The resulting timing accuracy is of the order of microseconds.

As mentioned previously, information relating to the angle of arrival (AOA) of each burst of sound (direct-path sound or echo) can be used to help resolve any ambiguity in determining from which reflective surface an echo has bounced. It can also be combined with time-of-arrival or time-difference-of-arrival information to improve the accuracy of the position estimate.

AOA information can be obtained by comparing the relative responses of directional microphones and an omnidirectional microphone. For a peak identified using cross-correlation in a waveguide channel k the corresponding peak in a proximate omnidirectional channel can be used as a reference to calculate the ratio of amplitudes $A_{km}=A_{wvgd-k}/A_{omni}$ for peak m.

If the waveguide microphones are constructed such that there is considerable overlap in spatial sensitivity with the omnidirectional microphone(s) and one another, the angle of arrival can be estimated by minimizing the error expression:

$$\varepsilon_m = \sum_k (A_{km} - I(\phi - \phi_k, \theta - \theta_k))^2$$

where $\Phi_k$ and $\theta_k$ are the angles of the major axis of sensitivity for a conical waveguide k. A minimum of two ratio measurements is required for a unique fix of the AOA.

The response of an omnidirectional microphone equipped with a conical waveguide with circular entrance opening of diameter a can be calculated with great accuracy to be (in spherical coordinates):

$$I(\phi, \theta) = G\frac{\sin(ka\sin(\phi))}{ka\sin(\phi)}\frac{\sin(ka\sin(\theta))}{ka\sin(\theta)}$$

where k is the spatial wave vector $2\pi f/c$.

Waveguides with square cross-section, such as the waveguide 12 may be approximated by:

$$I(\phi, \theta) = G\frac{\sin(ka\sin(\phi))}{ka\sin(\phi)}\frac{\sin(kb\sin(\theta))}{kb\sin(\theta)}$$

where a and b are the dimension of the rectangular entrance cross-section.

Although the position of the mobile unit may be estimated using the time difference of arrival (TDOA) of the signals along the direct path 54, the indirect side-wall path 56, 58, the indirect ceiling path 60, 62, and any other paths for which suitable microphones (not shown) are in place, more efficient use of the time-of-arrival information can be made if the time of transmission from the mobile unit 48 is also known.

To exploit this the mobile unit 48 in this embodiment contains a clock and is arranged to communicate the time of transmission of the sound signal to the receiver or to a separate processing means. The separate processing means may be a server that maintains the state of the clocks from every mobile unit (including estimated values for clock drift); in addition it may allocate to each mobile unit a time slot for ultrasound signal transmission. On receipt of a signal from the mobile unit 48 containing a time stamp by the mobile unit, the accuracy of the mobile unit's clock is evaluated to determine an estimate of the actual time of transmission. This is made possible when there is more information than the minimum required for position determination In this arrangement, an accurate TDOF position estimate of the mobile unit 48 allows the mobile unit's clock to be updated.

Alternatively the infrastructure may communicate the time to the mobile unit 48 (for example over an RF channel), which is provided with means to synchronize its clock to a central clock. The mobile units may, in addition, be allocated a time slot from the central server in which to transmit their sonic signals.

Figure 6:
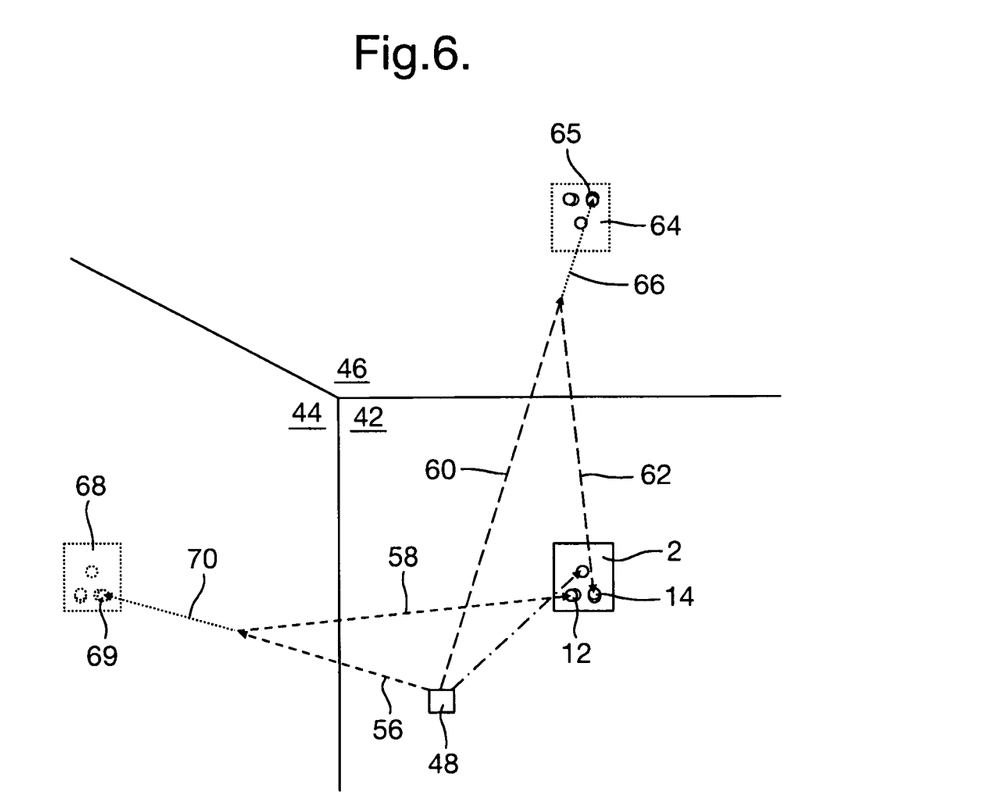
FIG. 6 is a diagram similar to FIG. 5 showing the locations of the 'virtual receivers'.

To determine the position of the mobile 48, the time of transmission and the aforementioned times of arrival of the signal at the receiver 2 along various paths are used in a modified form of trilateration as will be explained with reference to FIG. 6. The position calculations are made as if two 'virtual receivers' 64, 68 are provided. The first virtual receiver 64 is located directly above the real receiver 2, as far above the ceiling 46 as the receiver 2 is below it. It is effectively a reflection of the receiver 2 in the plane of the ceiling 46.

Similarly, the second virtual receiver 68 is located at the same height as the real receiver 2 in the same plane as the back wall 42 and as far to the left of the left wall 44 as the receiver 2 is to the right of it. It is effectively a reflection of the receiver 2 in the plane of the left wall 44.

It will be appreciated that, for any location of the mobile unit 48 within the room, the effective distance 60, 66 from the mobile unit 48 to the 'microphone' 65 of the first virtual receiver 64 (corresponding to the right directional microphone 14 of the real receiver 2) is exactly equal to the total real path length 60, 62 of the reflected sound.

Similarly, the effective distance 56 70, from the mobile unit to the 'microphone' 69 of the other virtual receiver 68 (corresponding to the left directional microphone 12 of the real receiver 2) is equal to the real path length 56, 58.

The positions of the virtual receivers 64, 68 can be calculated simply from the distance of the real receiver 2 from the wall 44 and ceiling 46. Thereafter their positions can be determined empirically by using a calibration transmitter placed at a know position relative to the receiver.

By treating the ultrasonic signal from the mobile unit as being received at the two virtual receivers 64, 68 as well as the real one, a conventional trilateration calculation can be performed as is described below.

Trilateration is a method of determining the relative position of an object using the geometry of triangles, the known position of two or more reference points, and the measured distance between the object and each reference point. The position of the object in space is given by the solution of the three-dimensional trilateration problem, found by taking the equations of three spheres and setting them equal to one another to find their intersection points.

By representing the known position of each virtual or real receiver i (more precisely, the relevant microphones of each) by the spatial coordinates $x_i, y_i, z_i$, and letting x, y, z be the coordinates of the mobile unit 48, the distance from the mobile unit 48 to each receiver i is given by:

$$d_i = \sqrt{(x-x_i)^2+(y-y_i)^2+(z-z_i)^2}.$$

The speed of sound v in air is approximately $331.4+0.6\,T_C$ m/s where $T_C$ is the air temperature in degrees Celsius, which may be measured by a thermometer in the receiver or elsewhere. Since $$v = \frac{d_i}{t_i - t_0},$$

where $t_0$ is the known time of transmission of the sound from the mobile unit 48 and $t_i$ is the known time of arrival of the sound at receiver i, for each receiver i the following holds true:

$$\sqrt{(x-x_i)^2+(y-y_i)^2+(z-z_i)^2} \approx (t_i-t_0)\times(331.4+0.6\times T_c).$$

The only unknowns are x, y, z, the coordinates of the mobile unit 48. Since there is one real and two virtual receivers, there are three such independent equations and thus the three unknowns x, y, z can be easily determined. Although there are typically two points of intersection between any three overlapping spheres, not just one, because the receiver 2 in mounted on the back wall 42 of the room (and the virtual receivers 64, 68 are in the same plane as the back wall 42), only one of the points of intersection will lie within the room, so the correct solution is easily identified.

As well as the mobile unit 48 emitting signals for position determination, signals from the mobile unit may be used to transmit data to the receiver. This could be for example an identity code, status information or indeed any other information as required. The information can be encoded using signals that preferably have a low cross-correlation with the positioning signals, as well as with each other. The data signals themselves might also have a highly peaked auto-correlation, such that they also may be used for positioning events.

One possibility is that, say, linear up and down chirps are used for positioning and Doppler-shift measurement, but single-tone FSK is used subsequently to send data. Although simple to encode and decode, a disadvantage of such a scheme is that considerable cross-correlation between the data signals and the positioning chirps exists, especially when strong echoes come into play. This can make it more difficult to identify the peaks in a cross-correlation with the chirp signals belonging to genuine echoes. However, this can be mitigated by transmitting the positioning signal and the data in two non-overlapping frequency bands; e.g. 35-39 kHz for the chirp and 39-45 kHz for the data.

In this system genuine echoes may be separated from other peaks by performing separate cross-correlations for the up and down chirp signals, and identifying similar peaks that are shifted by the time separation as the two emitted chirps. Peaks are similar if both amplitude and peak sharpness have similar values.

One possible criterion that may be applied in this context is $$a\left|\frac{A_\uparrow - A_\downarrow}{A_\uparrow + A_\downarrow}\right| + (1-a)\left|\frac{S_\uparrow - S_\downarrow}{S_\uparrow + S_\downarrow}\right| < \text{threshold}$$

where A is the peak amplitude and S is the sharpness of the associated peaks of the up and down chirp, while a is a weighing factor between 0 and 1.

However, this approach remains prone to false echo detections and a more rigorous solution is to replace the single tones with chirp signals that have a highly peaked auto-correlation and low cross-correlation. These same chirps might then be used both for positioning and data transmission. By using a finite set of possible chirps, the two functions can be achieved of performing cross-correlation (which requires knowledge of the signal being sent) and data transmission in which the data is encoded in the sequence of chirps. These chirps may be linear chirps as previously described, but may alternatively be of a spread spectrum type.

At the receiver 2, or other processing means, the signals can be detected using matched filter cross-correlation with the finite number of chirps used in the signaling scheme. However, increasing Doppler shift results in gradual degradation of the auto-correlation signal. This can be addressed by performing cross-correlation of the received signal with Doppler-shifted versions of the chirps used in the signaling scheme, but this is computationally demanding.

Thus, in the present embodiment, instead of using FSK for data communication, linear up and down chirps are used for positioning and Doppler-shift measurements, and chirps, with highly peaked autocorrelation and low cross-correlation, are also used for data communication. The linear chirps can then be used to determine the Doppler shift and the cross-correlation templates, and the data chirps received at the receiver 2 can then be corrected by an array-shifting operation in the frequency domain to correct for Doppler shift.

The mobile unit 48 is thus preferably arranged to emit a positioning signal followed (or preceded) by its identity, such as a serial number, encoded using chirped tones.

Because there may be circumstances in which it is not possible for the receiver 2 to decode the data signal (when, for example, the mobile unit 48 is obscured behind an object in the room, and the pattern of echoes is thus very complex), the mobile unit 48 is further arranged to emit its identity over a more basic, slower protocol, such as FSK at a slow rate, to allow the receiver 2 to fall back to decoding the slower message in order to determine at least which mobile units are in the room (even if their locations cannot be determined).

Conventional communication schemes for ultrasound communication suffer from interference effects caused by echo signals originating from the major reflecting surfaces in a indoor environment. One approach to obtain robust communication is to adapt the transmission scheme such that echo signals have abated by the time a tone is resend. However this result in relatively low communication speeds (e.g. 50-200 bits/s).

Instead, using the chirps signals described above to identify echo delay and attenuation, the echo signals, far from being a hindrance to communication, can be aggregated and used to help recover the signal X(t) emitted by the mobile unit. Assume that the detected signal contains m significant correlation peaks resulting from m different paths taken by the signal. For each of the peaks, the attenuation $K_m$ and phase accurate time location $\tau_m$ is obtained. From these, the effective transfer function of the chirp signal transmission channel can be obtained as a function of frequency:

$$H_{chan}(\omega) = \sum_m K_m e^{-j\omega\tau_m}$$

If the data signal is transmitted in close time proximity to the chirp(s) from which the channel model is constructed (i.e. while the position and velocity of the mobile unit 48, and of other objects in the room, remain substantially unaltered), the same transfer function can be used to recover the data signal sent by the mobile unit:

$$X(\omega) = \frac{Y(\omega)}{H_{chan}(\omega)}$$

where Y is the received signal.

Transforming the signal back to the time domain, the X(t) signal can be analyzed and the transmitted data can be recovered.

This method is heavily dependent on a high accuracy of the estimate of the delay times (better than 0.05 pi). In addition the method will fail for echoes that are Doppler-shifted with respect to one another, if no corrective measures are taken. It can therefore be attractive to perform echo aggregation in a domain that is less dependent on phase accuracy and Doppler correction.

Thus, the present embodiment uses the STFT (short time Fourier transform) domain, where all phase information has been removed. The STFT forms of the signals described above can be viewed as matrices with the row index corresponding to discrete frequency (i) and the column index (j) to the discrete time shift $t_{shift}$. The STFT time shift $t_{shift}$ should be chosen such that the received signals can be regarded as quasi-stationary over this time-period. The received signal in the STFT domain $Y_{kj}$ can be seen as comprising time-shifted and attenuated copies of the original signal $X_{ij}$. The matrix $Y_{kj}$ has been padded symmetrically with rows of zeros to maintain the correspondence between the row index k and the frequency index i. The STFT form of the transfer function for m echoes with attenuation factor $K_m$ therefore takes the form:

$$H_{ki} = \begin{pmatrix} K_1 & 0 & \cdots & & & 0 \\ 0 & K_1 & & & & \vdots \\ \vdots & & K_1 & & & \vdots \\ & & & K_1 & 0 & \\ \vdots & & & & K_1 & \\ 0 & \cdots & & & & \\ K_m & & & & & \\ \vdots & K_m & & & & \\ & & K_m & & & \vdots \\ \vdots & & & K_m & 0 & \\ 0 & \cdots & \cdots & 0 & K_m \end{pmatrix}$$

In other words, it takes the form of identity matrices multiplied by attenuation coefficients $K_m$ and time-shifted by the discrete time row index given by:

$$k_m = \frac{\tau_m}{t_{shift}}.$$

Fractional values of k can be approximated by two point interpolation in the matrix.

The matrix $H_{ki}$ can therefore be constructed after all the attenuation and echo locations have been determined. By taking the pseudo-inverse or inverse of the matrix $H_{ki}^{-1}$, a good estimate of the signal originally transmitted by the mobile unit 48 can be obtained:

$$X_{ij} = H_{ki}^{-1} Y_{kj}.$$

The approach described above thus uses the accurate identification of the delays and attenuation factors of all significant echoes from channel characterization signals, such as chirps. This information is then used to construct a communication channel model in the form of a discrete time-frequency matrix H, which can be used to aggregate overlapping echoes in the received channel signal and thereby recover the original transmitted signal in a discrete time frequency format.

Conventional decoding of the recovered signal in the time frequency domain is then undertaken using an approach appropriate for the signal coding scheme selected in order to extract the communicated data.

Measurements of the echo attenuation factor $K_m$ can be degraded by the presence of multiple echoes in the signal Y(t). In this case, the inversion procedure above can be used to obtain a first estimate of $X_{ij}$ and the factors $K_m$ can be adjusted iteratively to minimize the error function:

$$\epsilon = (Y_{kj} - H_{ki} X_{ij})^2.$$

Alternatively, the autocorrelation of $X_{ij}$, or some other error functions that incorporates prior knowledge about the communication scheme, can be minimized.

This method can be extended to account for multiple microphone channels by concatenating the additional channel signals to the $Y_{kj}$ array, introducing an additional index for each channel c giving $Y_{kj}^c$. The echo characteristics for channel c determined from the initial positioning signal are likewise concatenated to the $H_{ki}$ array resulting in $H_{ki}^c$. The common original signal can now be recovered by inversion:

$$X_{ij} = H_{ki}^{c-1} Y_{kj}^c.$$

It will be appreciated by the person skilled in the art that, in other embodiments, the method above can be adapted to use alternative time frequency transforms such as the Gabor, wavelet transform etc. Such transforms can offer better time-frequency resolution and can be invertible, but are potentially more computationally demanding. Inversion of the $X_{ij}$ signal allows calculation of the $R_{xy}$ (cross-correlation) signal and may result in a more accurate identification of the echo location and attenuation factors. This approach can also be employed in an iterative fashion to arrive at a improved estimate of $X_{ij}$. Alternatively, echo compensation can be performed in the frequency domain.

Figure 7:
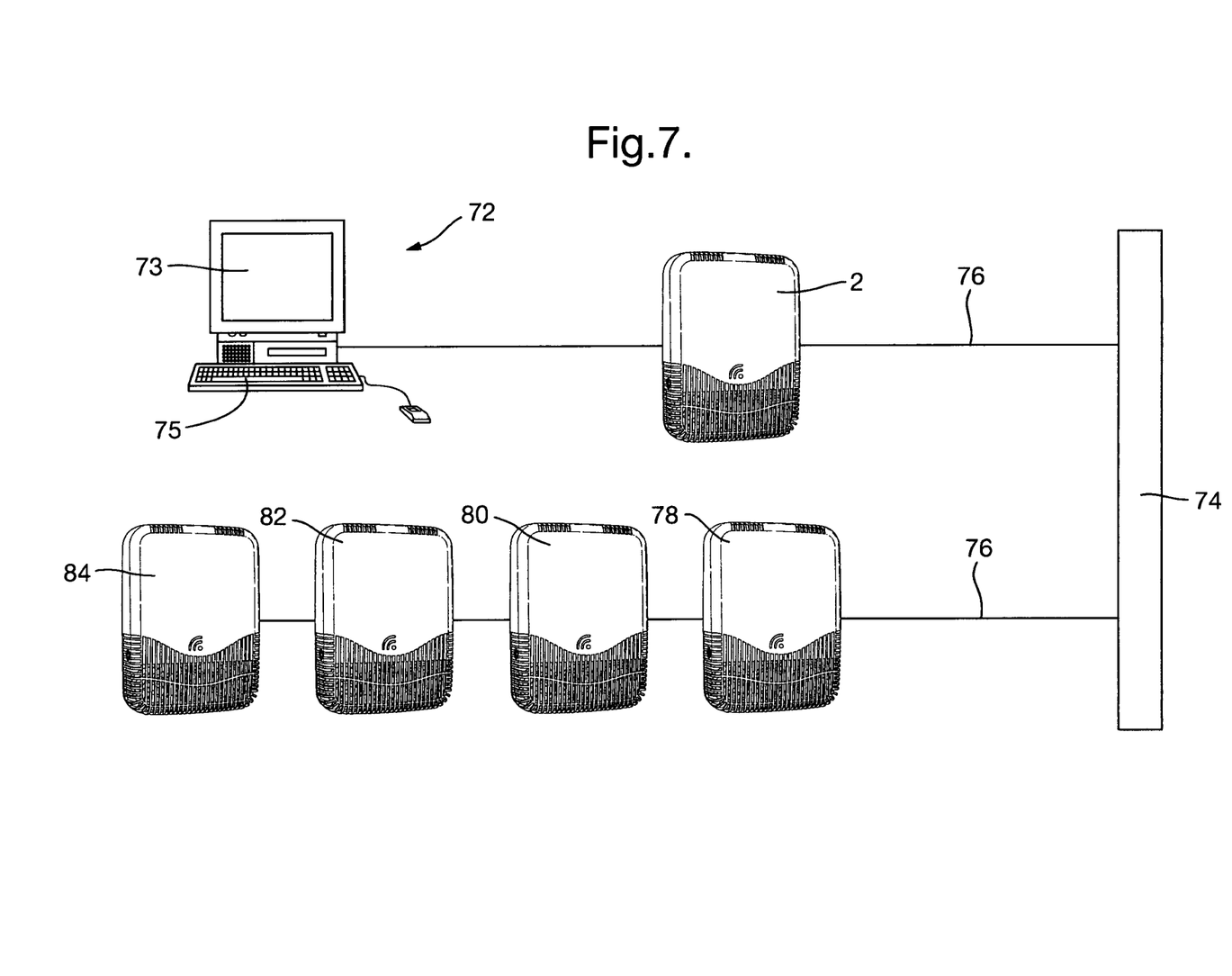
FIG. 7 is a schematic diagram of the receiver networked with other receivers and a central processor.

FIG. 7 shows a schematic layout showing the receiver 2 in the context of a large network 74. Power over Ethernet cabling 76 connects the receiver 2 to a central processor 72 and to three additional receivers 78, 80, 82. This cabling distributes both electrical power and communication packets between the various components. The additional receivers 78, 80, 82 are broadly identical to the first receiver 2, as described above. One or more of them may be located in the same room as the first unit 2, either separated from the first unit but more than the acoustic transmission range of the mobile unit 48 in order to independently cover a different part of the room, or cooperating with the first unit 2 in order to provide greater accuracy when determining the position of the mobile unit 48. Alternatively, each of the receivers 2, 78, 80, 82 may be located in its own room.

One of the receivers 82 is connected by an RS-485 serial link to a digital satellite microphone unit 84. This satellite unit comprises an omni-directional microphone and two directional microphones as in the first receiver 2, but it does not contain most of the timing, memory and processing circuitry of the receivers; instead, it is arranged to digitize the electrical outputs of the microphone transducers and send these substantially unprocessed to the connected receiver 82. Since a digital satellite microphone unit 84 is simpler and therefore cheaper than a receiver, additional coverage of a room or series of rooms can be obtained at lower cost through the use of these satellite units than would be the case if the main receivers needed to be used in every instance.

Furthermore, the main receiver 2 may optionally have an input for wired connection to an external analogue microphone unit (not shown). Analogue electrical signals from the external unit's transducer are sent down the wire to the main receiver 2. Such an external analogue microphone unit can be manufactured more cheaply even than the digital satellite microphone unit 84; however additional analogue-to-digital hardware may be required in the main receiver 2 to support such a connection.

The central processor 72 may receive raw digitized acoustic transducer outputs from the connected receivers 2, 78, 80, 82, either in real time without any timing information (e.g. when the receivers do not have internal clocks), or time-stamped by the receivers. Alternatively, the receivers may analyze the transducer outputs to determine the times of arrival of the signal(s) from the mobile unit 48 and any other mobile units according to the invention and may pass these times to the central processor. In yet another alternative, the receivers can run a position-determining algorithm, such as the modified trilateration scheme described above, and send position coordinates of the mobile unit 48 to the central processor 72. It will be appreciated that the division of labor between the receivers and the central processor 72 is not an essential feature of the invention and may depend on factors such as the processing capabilities of the various components and the speed of network connections therebetween.

The central processor 72 comprises display means 73 and input means 75. By means of the position-determining capabilities of the receivers 76, 78, 80, 82 and the central processor 72 itself, the central process 72 is able to track the whereabouts of the mobile unit 48 and optionally many other similar such mobile units. It may display graphically the whereabouts in a two- or three-dimensional model of the environment in which the mobile unit is located. A human user (not shown) may interact with the central processor 72 via the input means 75 in order to determine the location of any particular mobile unit.

The mobile unit 48 might be arranged to periodically transmit an ultrasound signal e.g. every minute and/or it may be arranged to respond with an ultrasound signal to a probe signal e.g. from the receiver 2 which might therefore have an RF or ultrasound transmitter.

As mentioned above the distances of the three receivers 12, 14, 20 from the wall 44 and ceiling 46 can simply be measured, but if more accuracy is required. The receiver 2 can optionally carry out a self-calibration method. In this method the receiver transmits a calibration sound signal into the room from an acoustic transducer which could for example be the one from the omni-directional microphone 20. The receiver 2 then receives the echoes of this sound signal reflected from the various reflective surfaces in the room. By measuring the delay between transmission of the calibration signal and its receipt at the omni-directional microphone 20 and directional microphones 12, 14, and processing these appropriately, the relative positions of the reflective surfaces and the receiver 2 can be determined or refined. For example, the path of the sound signal traveling from the receiver 2 to the left wall 44 and back to the receiver 2 is substantially twice the length of the perpendicular distance of the receiver 2 from the left wall; knowledge of the travel time of sound along this path therefore allows the perpendicular distance to be calculated very straightforwardly.

Thus it will be seen from the embodiment described above that accurate determination of the position of a mobile unit within a room can be obtained by use of timing information of acoustic signals reflected off objects within the room. Moreover this can be achieved using just a single, self-contained unit which is simple and inexpensive to install and which can even calibrate itself.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed herein as the best mode contemplated for carrying out this invention.

What is claimed is:

1. A method of determining the position of a mobile unit within a detection zone comprising:
    emitting an acoustic signal from the mobile unit;
    receiving said acoustic signal along a first path from the mobile unit at a first transducer;
    receiving an echo of said acoustic signal after reflection from a surface within said detection zone at a second transducer;
    determining the time of arrival at the first transducer of the acoustic signal along said first path;
    determining the time of arrival of the echo at the second transducer; and
    determining the position of the mobile unit within the detection zone from said times of arrival,
    wherein the first transducer is optimised for the reception of the signal along the first path, and the second transducer is optimised for the reception of the echo, the second transducer being configured to have greater directional sensitivity than the first transducer, and being directed towards said surface.

2. The method of claim 1 further comprising determining the time of arrival of the echo relative to the time of arrival of the acoustic signal along said first path.

3. The method of claim 1 further comprising:
    receiving a plurality of echoes of said acoustic signal;
    determining the times of arrival of the plurality of echoes; and
    determining the position of the mobile unit within the detection zone from said times of arrival of the plurality of echoes.

4. The method of claim 1 wherein determining the position of the mobile unit within the detection zone comprises performing a trilateration or multilateration calculation using information relating to one or more virtual receivers.

5. The method of claim 1 further comprising using information relating to the relative or absolute position or orientation of a receiver and information relating to the relative or absolute position or orientation of the surface to determine the position of the mobile unit.

6. The method of claim 5 further comprising conducting an automatic calibration step in which a processor acquires information relating to the location of the surface or a receiver by receiving an acoustic signal.

7. The method of claim 1 wherein the acoustic signal is ultrasonic.

8. The method of claim 1 further comprising using the difference between the true position of the mobile unit and a position estimated from the acoustic signal received by a receiver to calibrate or synchronise a clock on the mobile unit.

9. The method of claim 1 further comprising estimating the angle of arrival of the signal from the mobile unit at a receiver.

10. The method of claim 1 further comprising:
    determining the time of arrival of the acoustic signal along the first path at the first transducer and determining the time of arrival of the same acoustic signal at a further transducer; and
    determining, from these times of arrival, information relating to the direction from which the sound was received at a receiver.

11. The method of claim 1 wherein the first path is a direct path.

12. A position-determining system comprising a mobile unit, a receiver comprising a plurality of transducers, and a processor, the mobile unit being located within a detection zone, wherein:
    the mobile unit is arranged to emit an acoustic signal;
    the receiver is arranged to receive said acoustic signal at a first one of said transducers along a first path from the mobile unit, and to receive, at a second one of said transducers, an echo of said acoustic signal after reflection from a surface within said detection zone, wherein the first transducer is optimised for the reception of the signal along the first path, and the second transducer is optimised for the reception of the echo, the second transducer being configured to have greater directional sensitivity than the first transducer, and to be directed towards said surface; and
    the processor is arranged to determine the time of arrival of the acoustic signal along said first path at the first transducer, to determine the time of arrival of the echo at the second transducer, and to determine the position of the mobile unit within the detection zone from said times of arrival.

13. The position-determining system of claim 12 wherein the receiver is mounted on the ceiling of a room and the reflecting surface is the floor of the room.

14. The position-determining system of claim 12 wherein the receiver comprises an array of transducers.

15. The position-determining system of claim 12 wherein the processor is arranged to conduct an automatic calibration step in which the processor acquires information relating to the location of the surface and/or a receiver by receiving an acoustic calibration signal.

16. The position-determining system of claim 15 wherein the acoustic calibration signal is emitted by the receiver.

17. The position-determining system of claim 12 wherein the first transducer comprises an omni-directional microphone.

18. The position-determining system of claim 12 wherein the second transducer comprises a directional microphone, or an omni-directional microphone with a waveguide or shielding to add directionality.

19. The position-determining system of claim 12 wherein the second transducer has a half-angle of between 10 and 60 degrees.

20. The position-determining system of claim 12 wherein the first transducer has no half-angle or has a half-angle greater than that of the second transducer.

21. The position-determining system of claim 12 wherein the first transducer has a half-angle greater than 60 degrees.

22. The position-determining system of claim 12 wherein the second transducer, or a part thereof, is moveable in order to allow its directional axis to be adjusted.

23. The position-determining system of claim 22 wherein the second transducer is mounted on a moveable support.

24. The position-determining system of claim 12 wherein the receiver comprises a plurality of microphones, each having greater directivity than said first microphone, and wherein the respective directional axes of said plurality of microphones are mutually nonparallel.

25. The position-determining system of claim 12 further comprising a processor arranged to use arrival times of signals at a plurality of receivers to determine the position of the mobile unit within the detection zone.

26. The position-determining system of claim 12 wherein the processor is configured to use the signal strength of the received echo to identify said surface from which the echo was reflected.

27. The position-determining system of claim 12 wherein the processor is configured to estimate an angle of arrival, at the receiver, of the signal from the mobile unit.

28. The position-determining system of claim 12 wherein the acoustic signal is ultrasonic.

29. A receiver for use in a system for determining the position of a mobile unit within a detection zone, the receiver comprising:
   a plurality of transducers and a processing system;
   wherein the receiver is arranged to receive an acoustic signal at a first one of said transducers along a first path from a mobile unit, and to receive, at a second one of the transducers, an echo of said acoustic signal after reflection from a surface within a detection zone,
   wherein the first transducer is optimized for the reception of the signal along the first path, and the second transducer is optimised for the reception of the echo, the second transducer being configured to have greater directional sensitivity than the first transducer, and to be directed towards the surface; and
   wherein the processing system is arranged to (i) determine the time of arrival of the acoustic signal along said first path at the first transducer, (ii) determine the time of arrival of the echo at the second transducer, and (iii) determine the position of the mobile unit within the detection zone from said times of arrival.

30. The receiver of claim 29, wherein the second transducer, or a part thereof, is moveable in order to allow its directional axis to be adjusted.

31. The receiver of claim 30, wherein the second transducer is mounted on a rotatable gimbal.

* * * * *